Nov. 28, 1939.  T. SCHLYTTER  2,181,794
SKI BINDING
Filed April 15, 1938
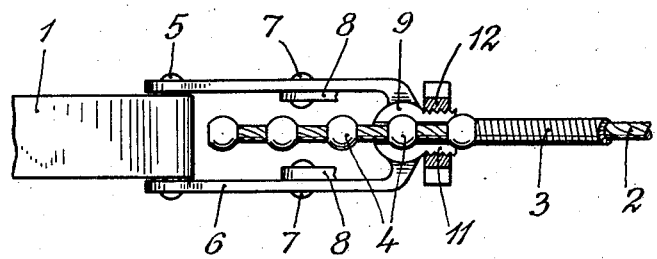
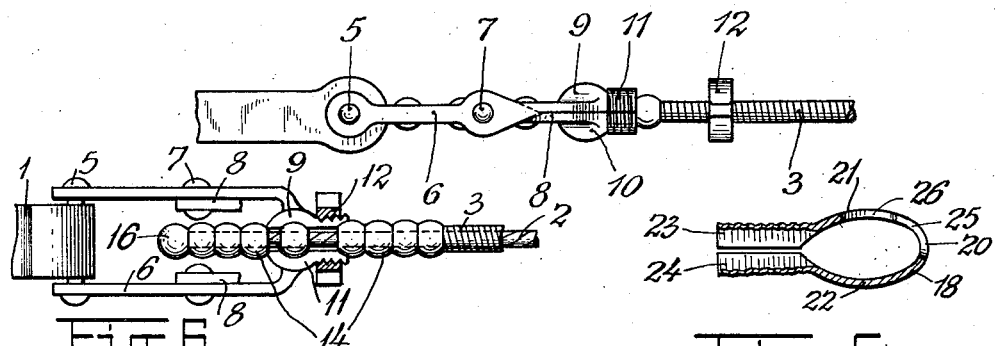
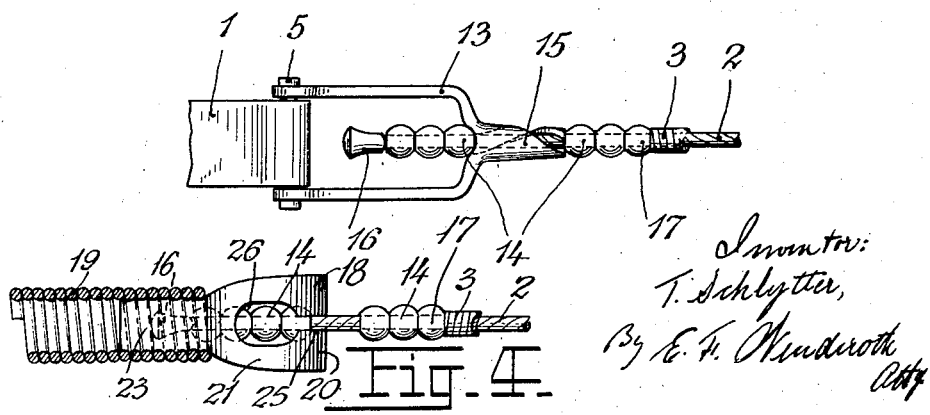
Inventor:
T. Schlytter,
By E. F. Wenderoth
Atty Patented Nov. 28, 1939

2,181,794

UNITED STATES PATENT OFFICE 2,181,794

SKI BINDING

Thomas Schlytter, Gyssestad, Slependen, near Oslo, Norway

Application April 15, 1938, Serial No. 202,343
In Norway September 7, 1936

11 Claims. (Cl. 280—11.35)

The present invention relates to ski bindings of the kind usually referred to as heel-strap bindings, and more particularly relates to the type of heel-strap bindings comprising a metal wire forming part of the heel-strap as a tension element.

The invention is concerned with arrangements for adjusting the length of heel-strap bindings of the type above described and has for an object to provide such an adjusting arrangement, which is easy to operate and which is reliable in use.

With this object in view one feature of the invention comprises a heel-strap binding comprising a wire which forms part of said heel-strap, a plurality of annular stops on said wire in the proximity of an end thereof and a gripping member fixed to an adjacent end of said heel-strap and adapted to engage positively and detachably any one of said stops.

Thus when using a binding comprising this feature of the invention the length of the heel-strap thereof may be adjusted by detaching the gripping member from that stop with which it is in engagement and thereafter engaging the gripping member with any one of the other stops as desired.

When stating that the gripping member is adapted to engage positively and detachably any one of the plurality of stops on the wire it is intended to exclude a known arrangement in heel-strap bindings, which is designed for releasing only and not for length adjustment, and which comprises two spaced conical beads on the wire and a resilient gripping member which normally cooperates with the innermost of the said beads, but which releases from the latter and engages the other bead which is provided at the end of the wire, when an excessive tension occurs.

The gripping member which is used according to the present invention may be composed of one or more parts and may be provided with means for preventing undesired releasing thereof. For example a locking ring may be provided which keeps the gripping member in engaging position, or the free end thereof may be formed with a sleeve-like extension which is split so as to provide a longitudinal slot which is preferably non-linear and through which the wire may be introduced into the said sleeve.

The stops referred to may be provided in spaced relation on the wire in which case it is preferred to make a fixed connection between the stops and the wire such as by soldering. However the stops may also be loosely mounted and in that case they may even be moveable in a longitudinal direction; in any case, if the annular stops are loosely mounted, the wire will have to be provided with a fixed stop at its extremity, for example with a thickened end portion in order to prevent the annular stops from falling off.

Further it is preferable to form the gripping member with a sleeve-like portion which surrounds the wire in engaged position, and which may conveniently be provided at the extremity of the gripping member and adapted to bridge the space between two adjacent stops.

These and other features and objects of the invention will appear from the following description taken in conjunction with the drawing, which shows by way of example those parts of a wire heel-strap binding, with which the present invention is concerned, in three different embodiments.

Fig. 1 is a fractional side view partially in section of a part of a ski binding permitting adjustment of the length thereof according to one embodiment of the invention.

Fig. 2 is a plane view to Fig. 1,

Fig. 3 is a side view corresponding to that of Fig. 1, of another embodiment of the invention, Fig. 4 is a side view corresponding to that of Fig. 1 of the third embodiment of the invention, Fig. 5 is a horizontal sectional view of the gripping member shown in Fig. 4, and Fig. 6 is a view similar to Fig. 1 but showing slidable stops on the cable.

In Fig. 1 numeral 1 designates the rear part of the heel-strap, 2 the twisted wire which forms the tension element of the forward part of the heel-strap and 3 the usual protecting winding for the wire. The winding 3 terminates at a distance from the extremity of the wire and on the naked end portion of the wire 2 there are soldered a plurality of annular stops 4 which form substantially spherical thickened portions or beads on the wire.

To the rear part 1 of the heel-strap there is hinged by means of the pivot 5 a gripping member comprising a part 6 of substantial U-shape and another part 8 likewise of substantial U-shape, which is pivoted to the part 6 by means of pins 7. The parts 6 and 8, part 8 being shown broken away in the drawing, are in their base portions formed with hemispherical cup-like portions 9 and 10 which enclose between themselves bead 4, and are further provided with a screw threaded extension 11 which bridges the space between the enclosed bead 4 and the next one and carries a locking ring in the form of the butterfly nut 12, which keeps the parts 6 and 8 together.

When an adjustment is to be made it may easily be effected without the use of tools or the like by unfastening the nut 12, turning the parts 6 and 8 away from each other and again closing them together about the desired bead and finally screwing the nut 12 on.

The embodiment shown in Fig. 3 differs in various respects from that shown in Figures 1 and 2. Thus the gripping member 13 is made in one piece and the annular stops or beads 14 are loosely mounted on the wire 2, so that they may be moved in a longitudinal direction when the member 13 is disengaged. A thickened end portion 16 prevents the stops 14 from falling off and a bead 17 soldered to the wire 2 fixes the position of the end of the winding 3 on the wire.

Apart from this the gripping member 13 has again substantial U-shape with its side portions pivoted to the rear part 1 of the heel-strap and again its free extremity 15 is in the form of a sleeve surrounding the wire 2 and bridging the space between two adjacent annular stops 14. On both sides of the sleeve 15 the beads 14 are in close contact with each other.

The sleeve 15 has a helical slot through which the wire 2 may be taken out in a lateral direction.

When it is desired to adjust the length of the heel-strap according to this embodiment of the invention the adjustment is effected by taking the wire 2 out of the sleeve 15 by a single movement of the hand, displacing one or more annular stops 14 in the forward or rearward direction on to the opposite side of the space left open by the sleeve 15 so that the open space or naked portion occurs further ahead or further back on the wire, and again inserting this portion of the wire through the slot in the sleeve 15.

In the embodiment shown in Figs. 4 and 5 that part of the heel-strap to which the gripping member 18 is fixed is a helical steel spring 19 of the kind usually employed in the rear part of wire heel-strap bindings and is shown in longitudinal section in Fig. 4.

In this embodiment the gripping member 18 is in one piece comprising an end wall portion 20 and opposed side wall portions 21, 22 having extensions 23, 24 which together form a screw threaded sleeve-portion which is screwed into the spring 19.

In this embodiment the annular stops 14 are arranged on the wire in the same manner as in the embodiment shown in Fig. 3, that is, they are free to move in a longitudinal direction on the wire and a fixed stop 16 is provided at the end of the wire and a fixed bead 17 is used to fix the position of the end of the winding 3 on the wire.

The end wall portion 20 and one side wall portion 21 of the gripping member 18 have a longitudinal slot which in said end wall portion 20 and in the endmost part of the side wall portion 21 has a width at least as great as the diameter of the wire 2 but smaller than the outer diameter of the annular stops 14 as shown at 25 in the drawing, whereas the major part 26 of the slot in the side wall portion 21 has a width at least as great as the outer diameter of the stops.

In Fig. 4 the wire is shown in engaged position within the gripping member 18 with some of the stops 14 situated within and others situated outside the member 18. When the heel-strap is tensioned the innermost one of those stops 14 which are located within the member 18 engages the edges of the slot 25 in the end wall portion 20 from inside and is prevented from releasing by the prolongation of this narrower slot portion into the side wall portion 21. In the position shown in Fig. 4 the end of the wire projects into the sleeve portion 23, 24 of the member 18 so that even if no tension is applied to the heel-strap the wire 2 is prevented from undesired disconnection from the member 18 because of the guiding of the wire within the sleeve portion 23, 24 in combination with the inherent stiffness of the wire.

When it is desired to make an adjustment of the length of the heel-strap the wire is pushed further into the member 18 until the endmost stop 14 on the outside engages the end wall portion 20 and then the wire 2 is bent laterally out of the slot portion 25 and the end thereof drawn out through the slot portion 26. Then any desired number of the stops 14 are displaced to the left or to the right on the wire 2 and the wire is again inserted through the slot portion 26 and engaged within the slot portion 25.

Various embodiments of the invention are possible which differ in many respects from the embodiments shown.

For example, if a locking ring is provided for preventing undesired releasing of the gripping member it is not essential to make the same in the form of a nut, such as in Figs. 1 and 2. When using a sleeve with a non-linear slot in order to prevent releasing it is not essential that the slot is helical. Further it is not essential that the annular stops on the wire have substantially spherical shape, etc.

In Fig. 6 is shown a construction in which the gripping member is identical with that shown in Figs. 1 and 2 but in which the stops 14 instead of being fixed on the cable, are slidable in exactly the same manner as are the stops 14 in Fig. 3. The same corresponding reference characters are used in this view as in the other view showing the corresponding parts.

When using a gripping member comprising parts which are movable relative to each other so as to form gripping fingers such as in the case described with reference to Figs. 1 and 2 it is not essential that they are freely pivoted, provided that they have sufficient freedom of movement for disengaging and reengaging the stops concerned.

The manner in which the gripping member is fixed to the adjacent end of the heel-strap is in no way essential. That part of the heel-strap to which said member is fixed may be of any desired configuration including a helical spring as shown in Fig. 4, a wire, an elastic strap, a tightener, etc.

It is usually preferred to provide a length adjusting arrangement according to the invention in both side portions of a heel-strap in a heel-strap binding. However, it is not intended to exclude the provision of the length adjusting arrangement in one side portion only.

I claim:

1. A heel-strap binding comprising a cable which forms part of said heel-strap, a plurality of annular stops slidably arranged on said cable in the proximity of an end thereof and a gripping member fixed to an adjacent end of said heel-strap for positively engaging and holding any one of said stops, said stops being only manually detachable from the gripping member.

2. A heel-strap binding comprising a cable which forms part of said heel-strap, a plurality of annular stops slidably arranged on said cable in the proximity of an end thereof, and a gripping member fixed to an adjacent end of said heel-strap for positively engaging and holding any one of said stops, said gripping member having a portion substantially surrounding the cable between adjacent stops when in engaged position, and said stops being only manually detachable from the gripping member.

3. A heel-strap binding comprising a resilient metal cable which forms part of said heel-strap, a plurality of annular stops on said cable in the proximity of an end thereof and a gripping means comprising a member of substantial U-shape, having side portions fixed to an adjacent end of said heel-strap and a base portion forming at least a part of a sleeve for positively engaging and holding any one of said stops while substantially surrounding the resilient cable between adjacent stops and bridging the space therebetween.

4. A heel-strap binding comprising a cable which forms part of said heel-strap, a plurality of annular stops on said cable in the proximity of an end thereof and a gripping member comprising two parts of substantial U-shape, each having side portions and a base portion, said side portions of one part being fixed to an adjacent end of said heel-strap, said side portions of the other part being hinged to said side portions of said first part and said base portions of said parts being each formed with a cup-like surface of a shape corresponding to that of said stops for positively engaging and holding any one of said stops from opposite sides, and being only manually detachable from the gripping member.

5. A heel-strap binding comprising a cable which forms part of said heel-strap, a plurality of annular stops on said cable in the proximity of an end thereof, a gripping member fixed to an adjacent end of said heel-strap and formed with a screw threaded extension, and a nut, said gripping member positively engaging and holding any one of said stops with said screw threaded extension surrounding the cable, and said nut being adapted to be screw threaded on said extension so as to prevent said gripping member from releasing when in engagement with said stop.

6. A heel-strap binding comprising a cable which forms part of said heel-strap, a fixed stop on an end of said cable, slidable annular stops on said cable in the proximity of said end and a gripping member fixed to an adjacent end of said heel-strap for positively engaging and holding any one of said slidable stops, said stops being only manually detachable from the gripping member.

7. A heel-strap binding comprising a cable which forms part of said heel-strap, a fixed stop on an end of said cable, slidable annular stops on said cable in the proximity of said end and a one-piece gripping member fixed to an adjacent end of said heel-strap for positively engaging and holding any one of said slidable stops, said stops being only manually detachable from the gripping member.

8. A heel-strap binding comprising a cable which forms part of said heel-strap, a fixed stop on an end of said cable, slidable annular stops on said cable in the proximity of said end and a gripping member fixed to an adjacent end of said heel-strap and comprising a sleeve-like extension, said gripping member positively engaging and holding any one of said slidable stops with said sleeve-like extension substantially surrounding the cable and bridging the space between adjacent stops.

9. A heel-strap binding comprising a resilient metal cable which forms part of said heel-strap, a plurality of slidable annular stops on said cable in the proximity of an end thereof and a one-piece gripping member fixed to an adjacent end of said heel-strap and formed with a sleeve-like extension, said sleeve-like extension being split substantially helically so as to permit said cable to be introduced thereinto for positive engagement of said gripping member with any one of said stops, and said stops being only manually detachable from the gripping member.

10. A heel-strap binding comprising a cable which forms part of said heel-strap, a plurality of slidable annular stops on said cable in the proximity of an end thereof and a gripping member fixed to an adjacent end of said heel-strap and formed with opposed side wall portions and with an end wall portion and slotted in said end wall portion and one of said side wall portions, so as to produce opposed slot edges which in said end wall portion and in the endmost part of said side wall portion are spaced by a distance at least as great as the diameter of said cable but smaller than the outer diameter of said stops and in said side wall portion are spaced by a distance at least as great as the outer diameter of said stops, so as to permit the cable end together with any desired number of said stops to be introduced into said gripping member through said slotted side wall portion for positively and detachably engaging any one of said stops with said slot edges of said end wall portion from inside.

11. A heel-strap binding comprising a cable which forms part of said heel-strap, a plurality of slidable annular stops on said cable in the proximity of an end thereof and a gripping member fixed to an adjacent end of said heel-strap and comprising a sleeve-like portion, opposed side wall portions and an end wall portion integral therewith and remote from said sleeve-like portion, said end wall portion and one of said side wall portions being slotted so as to produce opposed slot edges which in said end portion and in the endmost part of said side wall portion are spaced by a distance at least as great as the diameter of said cable but smaller than the outer diameter of said stops and in said side wall portion are spaced by a distance at least as great as the outer diameter of said stops, so as to permit the cable end together with any desired number of said stops to be introduced into said gripping member through said slotted side wall portion so as to extend with its extremity into said sleeve-like portion and with any one of said stops in positive and detachable engagement with said slot edges of said end wall portion from inside.

THOMAS SCHLYTTER.